United States Patent
Vucetic et al.

[19]

[11] Patent Number: 6,091,715

[45] Date of Patent: Jul. 18, 2000

[54] HYBRID RADIO TRANSCEIVER FOR WIRELESS NETWORKS

[75] Inventors: Jelena Vucetic; Paul A. Kline, both of Germantown, Md.

[73] Assignee: Dynamic Telecommunications, Inc., Germantown, Md.

[21] Appl. No.: 08/778,292

[22] Filed: Jan. 2, 1997

[51] Int. Cl.$^7$ .................................................. H04B 7/00
[52] U.S. Cl. .......................................... 370/277; 370/281
[58] Field of Search ..................................... 370/276, 277, 370/278, 281, 295, 329, 343, 344, 480, 339, 340, 279; 455/103

[56] References Cited

U.S. PATENT DOCUMENTS

| | | | |
|---|---|---|---|
| 4,862,514 | 8/1989 | Kedjierski | 455/161 |
| 5,163,181 | 11/1992 | Koontz | 455/103 |
| 5,199,069 | 3/1993 | Barrett et al. | 380/28 |
| 5,455,593 | 10/1995 | Ross | 342/375 |
| 5,493,695 | 2/1996 | Aitkenhead et al. | 455/54.1 |
| 5,600,707 | 2/1997 | Miller, II | 379/59 |

*Primary Examiner*—Huy D. Vu
*Assistant Examiner*—Alexander Boakye
*Attorney, Agent, or Firm*—Roberts Abokhair & Mardula, LLC

[57] ABSTRACT

A hybrid radio transceiver that includes one wideband receiver and multiple narrowband transmitters for use in wireless networks, having the advantage of providing lower cost but performance that is comparable to a transceiver that uses multiple narrowband transceivers. The hybrid radio transceiver provides software defined parameters to achieve flexibility in modulation and protocol types. The hybrid radio transceiver is adaptable to both capacity intensive and wide coverage applications, and supports communication links that are imbalanced in terms of data transmission capacity. The wideband receiver, of the hybrid radio transceiver, converts the RF to an IF which is digitized and passed to digital signal processors for tuning, filtering, demodulation and protocol control with eventual interface to the network. The narrowband transmitters, of the hybrid radio transceiver, use a variety of processes which include modulation in a narrowband exciter which feeds a narrowband power amplifier then combination of the signals before the antenna, or use of a multi-carrier power amplifier and low power combiner.

7 Claims, 6 Drawing Sheets

HYBRID RADIO TRANSCEIVER FOR WIRELESS NETWORKS

BACKGROUND OF THE INVENTION

1. Field of the Invention

This invention relates generally to radio frequency communications over wireless networks and more specifically to a hybrid transceiver that uses a wideband receiver in conjunction with a plurality of narrowband transmitters in a wireless base station.

2. Description of Related Art and Prior Art

Currently, the majority of radio transceivers in wireless networks are classified as narrowband radio transceivers. As such, typically in analog radio transceivers there is one transceiver per communication link or conversation. Since these transceivers are very expensive, the utilization of more than one transceiver per link is an expensive proposition. A typical narrowband base station comprises multiple narrowband transceivers, which typically support one communication link or conversation per transceiver.

U.S. Pat. No. 5,493,695 issued to Aitkenhead et al. discloses this typical type of one transceiver per communication link. Though not relevant to the present invention, Aitkenhead also provides a system and method to improve communication quality by using unallocated frequency channels. As a result, Aitkenhead provides a method to make use of two or more transceivers per communication link but does not provide any disclosure to replace the multiple narrowband receivers with a single wideband receiver, or provide for lower cost narrowband exciters.

More advanced cellular protocols that use Time Domain Multiple Access (TDMA) or Code Domain Multiple Access (CDMA) can support multiple communication circuits on a single RF carrier. Narrowband transceivers that handle TDMA and CDMA are more expensive than the simple analog radio transceiver.

Wideband radio transceivers, on the other hand, typically handle multiple RF carriers in one radio transceiver. Each wideband radio transceiver is much more expensive than an equivalent number of narrowband radio transceivers. Additionally, the economics of wideband are less favorable when using interfaces such as TDMA and CDMA since the ratio between the number of RF carriers and the number of telephone conversations is less than one. Thus, less radio transceivers are required in the narrowband case.

A typical wireless wideband base station comprises a Multi-Carrier Power Amplifier (MCPA) which receives a wideband signal from a wideband transmitter and amplifies multiple carriers for transmission. The MCPA has a number of disadvantages which include: poor power efficiency; as the number of carriers (N) increases, the power per carrier is reduced by a factor of 1/N; the MCPA is a critical path item and therefore a potential for single point failure, and redundant sparing is expensive; an MCPA is expensive as compared to single carrier power amplifiers; the MCPA has limited dynamic range.

Use of multiple RF carriers contained within a single wideband RF is disclosed in U.S. Pat. No. 5,455,593 issued to Ross. Ross makes use of multiple RF carriers to form the wideband transmitter section of the transceiver. Ross does not take address replacement of multiple narrowband receivers with a wideband receiver, or provide for lower cost narrowband exciters.

None of the above patents or existing technology addresses the need for a transceiver that combines the advantages of narrowband transmission and wideband reception in a hybrid transceiver to create a superior wireless network technology at reduced cost.

OBJECTIVES AND SUMMARY OF THE INVENTION

It is therefore an objective of the present invention to provide a hybrid radio transceiver based on wideband receiver and narrowband transmitter technology for wireless networks that forms a lower cost multi-channel base station and which combines the advantages of narrowband and wideband transceiver technology.

It is a further objective of the present invention to provide the hybrid radio transceiver with software defined parameters resulting in flexibility in both modulation and protocol types.

It is a further objective of the present invention to provide the hybrid radio transceiver in a form that is adaptable to both capacity intensive and wide coverage applications.

It is a further objective of the present invention to provide the hybrid radio transceiver in a form that supports communication circuits that have link imbalance in terms of data transmission capacity, and more especially for applications like video-on-demand and Internet subscriptions that require high bandwidth on the receive side and low bandwidth on the transmit side.

It is a further objective of the present invention to provide the hybrid radio transceiver in a form that supports bandwidth-on-demand applications and advanced communication services.

These and other objectives of the present invention will become obvious to those skilled in the art upon review of the following disclosure.

The present invention resolves the deficiencies of wireless narrowband radio transceiver networks through the use of a hybrid radio transceiver that is based on a wideband receiver and a plurality of narrowband transmitters. This is accomplished through use of only one wideband receiver with multiple narrowband exciters.

The wideband receiver of the hybrid radio transceiver of the present invention, converts the Carrier Radio Frequency to an Intermediate Frequency, then digitizes the wideband signal with high speed analog to digital converters. The digitized wideband signal is passed to a bank of Digital Signal Processors which tune, filter and decimate the wideband signal to extract the desired signal on the channel of interest. The signal on the channel of interest is then further processed for protocol control and interface to the network.

In one embodiment of the transmitter section of the hybrid radio transceiver of the present invention, the signals of interest, which are present on the network, are processed by the protocol control then individually sent to each of several narrowband exciters which each feed a narrowband power amplifier through a combiner into a duplexer and finally into an antenna. In an alternative embodiment of the present invention where a low power system is capacity limited, an MCPA and low power combiner may be exchanged for the combiner and the narrowband power amplifier. In this alternative embodiment, the signals of interest, are processed by the protocol control then individually sent to each of several narrowband exciters before the signals are amplified and combined in the low power combiner then sent through the MCPA into a duplexer and finally into an antenna.

As will be obvious to one of ordinary skill in the art, this transceiver results in the present invention providing a less expensive transceiver for base station networks.

DETAILED DESCRIPTION OF THE PREFERRED EMBODIMENT

Definitions:

Throughout the specification of the present invention, the following definitions apply.

Transceiver: The combination of radio transmitting and receiving equipment into a single set of equipment: usually for mobile use.

Narrowband: A band of Radio Frequency (RF) with sufficient bandwidth to accommodate a single RF carrier. A combination of narrowband transceivers which can be used for bandwidth-on-demand applications.

Wideband: A band of RF with sufficient bandwidth to accommodate multiple voice communication links.

Analog-to-Digital Conversion: Conversion of an analog input signal, that may vary continuously in amplitude, phase and frequency, to a sequence or series of discrete digital values.

Digital-to-Analog Conversion: Conversion of a sequence or series of digital values that represent the characteristics of a signal into an analog representation of that signal that may vary continuously in amplitude, phase and frequency.

RF: (Radio Frequency) typically ranging from 10 KHZ to 100 GHZ.

RF Carrier: A Radio Frequency wave having at least one characteristic that may be varied from a known reference value by modulation.

Time Domain Multiple Access (TDMA): A technique whereby multiple users share a single channel to communicate with each other through the use of non-overlapping time sequenced bursts of transmission.

Code Domain Multiple Access (CDMA): A technique whereby multiple users share a single channel to communicate with each other through the use coded transmissions each transmission being coded with different coding rules so that each transmission maintains its unique identity. This is a spread spectrum technique.

Quantization Spurs: Undesired components in frequency due to periodic errors in the signal.

Aliasing: The misrepresentation that occurs when Nyquest is not observed for sampling rate.

Filtering: Removing a portion of the signal to improve signal to noise, or isolation of a spectrum of interest.

Tune: Change the center frequency of the receiver, transmitter or transceiver.

Decimate: Reduce the sampling rate by a factor of N.

Protocol Control: A formal set of conventions governing the format and relative timing of message exchange between two communication terminals. The means used to control the orderly communication of information between stations.

Figure 1:
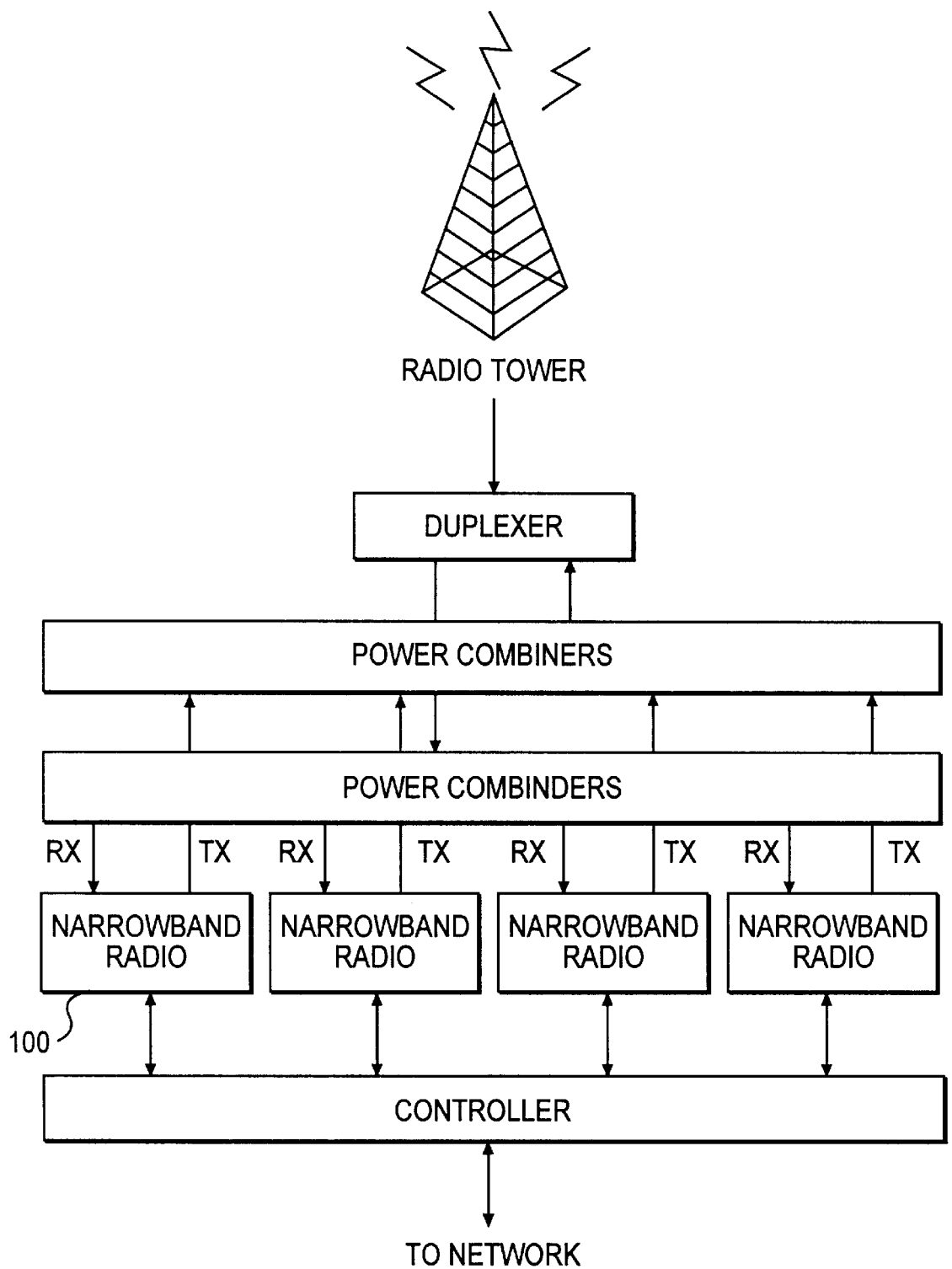
FIG. 1: Illustrates a typical narrowband transceiver base station

Referring to FIG. 1, the components and the arrangement of a typical narrowband base station is shown. The typical narrowband base station comprises multiple narrowband transceivers 100, which typically support one communication link or conversation per transceiver. This arrangement has the disadvantage of requiring redundant components and therefore greater expense.

Figure 2:
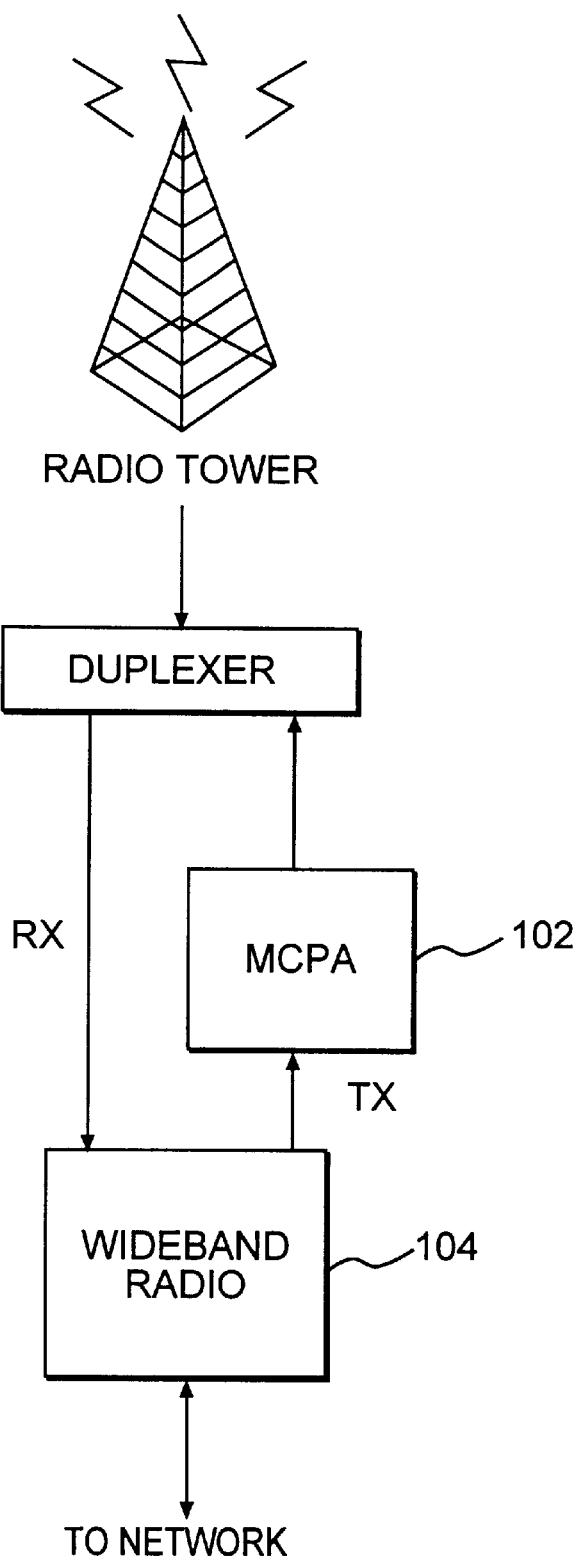
FIG. 2: Illustrates a typical wideband transceiver base station

Referring to FIG. 2, the components and arrangement of a typical wireless wideband base station is shown. The Multi-Carrier Power Amplifier (MCPA) 102 receives a wideband signal from the wideband transmitter 104 and amplifies multiple carriers for transmission. The MCPA has a number of disadvantages which include: poor power efficiency; as the number of carriers (N) increases, the power per carrier is reduced by a factor of 1/N; the MCPA is a critical path item and therefore a potential for single point failure, and redundant sparing is expensive; an MCPA is expensive as compared to single carrier power amplifiers; the MCPA has limited dynamic range.

Figure 3:
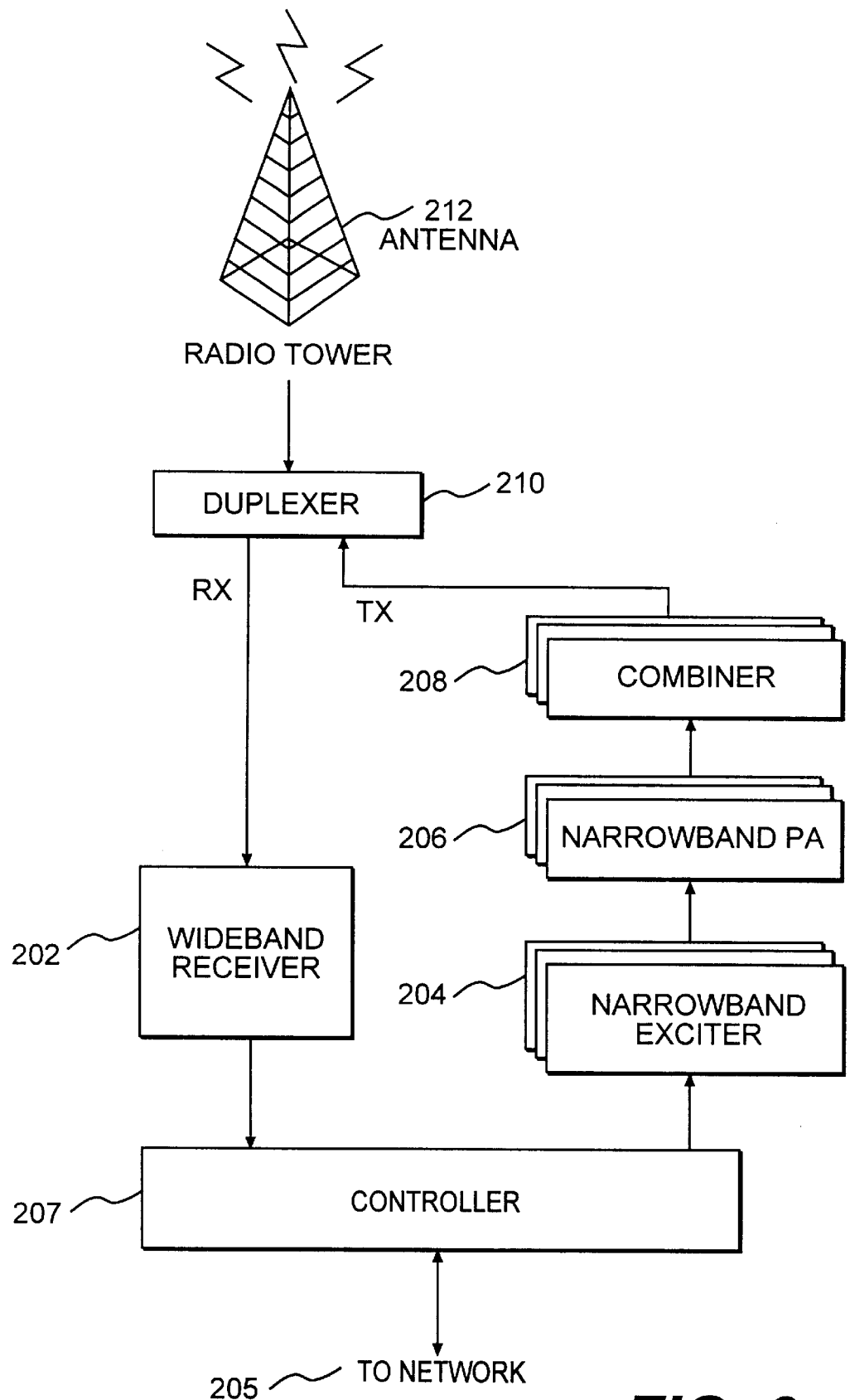
FIG. 3: Illustrates an alternative embodiment of the present invention (A hybrid radio transceiver with narrowband power amplifiers)

Referring to FIG. 3, an alternative embodiment of the present invention, a hybrid radio transceiver based on a wideband receiver and a plurality of narrowband transmitters for wireless networks are required. Only one wideband receiver 202 and multiple narrowband exciters 204 are required. In this configuration, the desired transmit signals of interest are on a network 205 and are processed by a controller 207 before the desired transmit signal is passed to an individual narrowband exciter 204. The individual narrowband exciter processes the desired transmit signal and feeds the signal to a narrowband power amplifier (PA) 206, which provides the capabilities of transmitting high power through the combiner 208 and the duplexer 210. The duplexer processes the signal and it is finally passed to the antenna 212. Without restricting the present invention in any way, an example of a narrowband exciter is the: HP IC HPMX2003 chip which has the requisite functionality for the present invention. An example of a narrowband power amplifier suitable for the present invention is the: TPL Communications PA8-1AC-RXRF, and an example of a narrowband combiner: Sinclair TJ4231.

Figure 4:
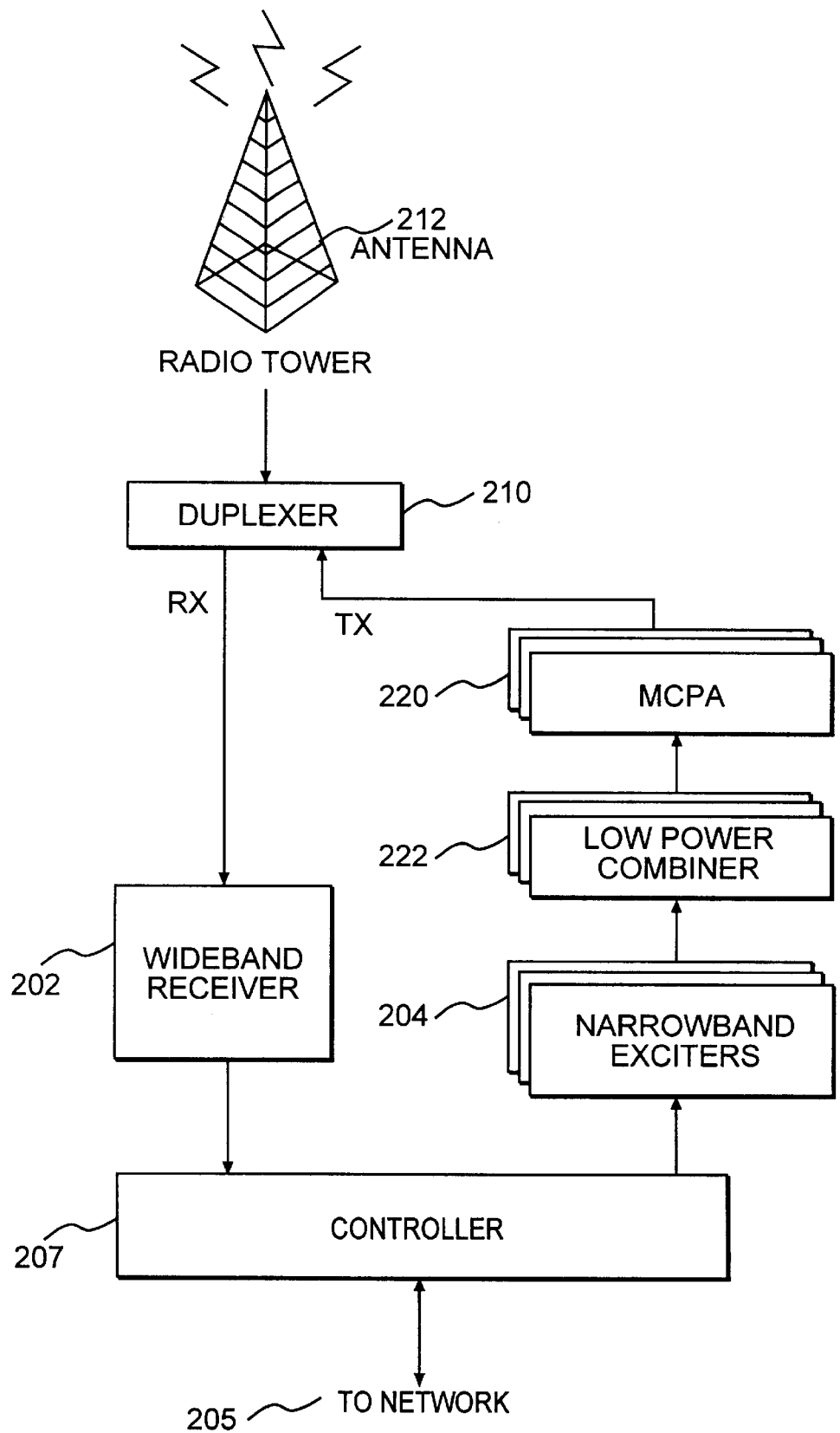
FIG. 4: Illustrates an alternative embodiment of the present invention with an MCPA in a low power system.

Referring to FIG. 4, a alternative embodiment of the present invention is shown. As in the previously described alternative embodiment, this alternative embodiment has only one wideband receiver 202 and multiple narrowband exciters 204. In this alternative configuration, the desired transmit signals of interest are on a network 205 and are processed by a controller 207 before the desired transmit signal is passed to an individual narrowband exciter 204. The individual narrowband exciter processes the desired transmit signal and feeds the signal to a low power combiner 222 where it is processed and passed to an MCPA 220. The high power amplified transmit signals are passed from the MCPA to a duplexer 210. The duplexer processes the signal and the signal is finally passed to the antenna 212. The alternative embodiment of this configuration may be appropriate for a low power system that is capacity limited. Without restricting the present invention in any way, an example of an MCPA suitable for the present invention is the: Spectrian Cellular MCPA, and an example of a low power combiner suitable for the present invention is the: Minicircuits Inc. ZC16PD-960.

Figure 5:
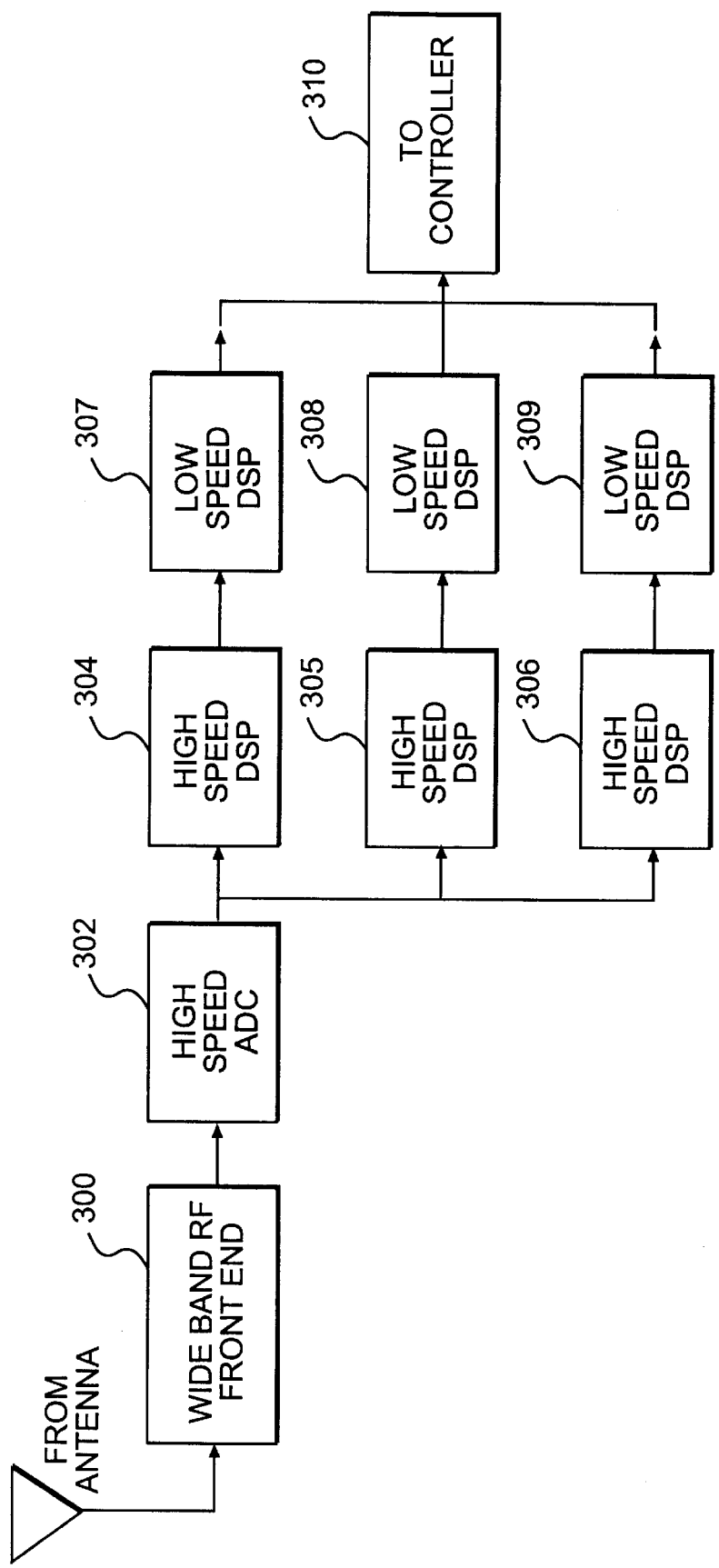
FIG. 5: Illustrates the wideband receiver of the present invention.

Referring to FIG. 5, the illustration shows an alternative embodiment of wideband receiver of the present invention. The Wideband RF Front End 300 converts the RF to an Intermediate Frequency (IF) that is digitized using a high speed Analog-to-Digital converter (ADC) 302. Dithering of the wideband signal is required prior to digitization in order to lower quantization spurs. The ADC 302 converts the RF spectrum to digital form, where it is passed to each of the channel banks. Without restricting the present invention in any way, an example of a high speed ADC that would be appropriate for this function includes: Analog Devices (Raleigh N.C.) AD9042. A channel bank of the present invention consists of a high speed Digital Signal Processor (DSP) 304, 305, 306 and a low speed DSP 307, 308, 309. One channel bank is needed for each received RF carrier. The high speed DSP 304, 305, 306 tune, filter and decimate the digital data for the channel of interest. Without restricting the present invention in any way, an example of a high speed DSP chip that is appropriate for this function includes: Harris HSP50016. Once decimated, the low speed DSP's 307, 308, 309 can be used to demodulate the digital data and handle the protocol control. Without restricting the present invention in any way, examples of low speed DSP chips that are appropriate for this function include: Texas Instruments TMS 320C and TMS 5X. The output from the low speed DSP goes to the Controller 310 for interface to the network.

Figure 6:
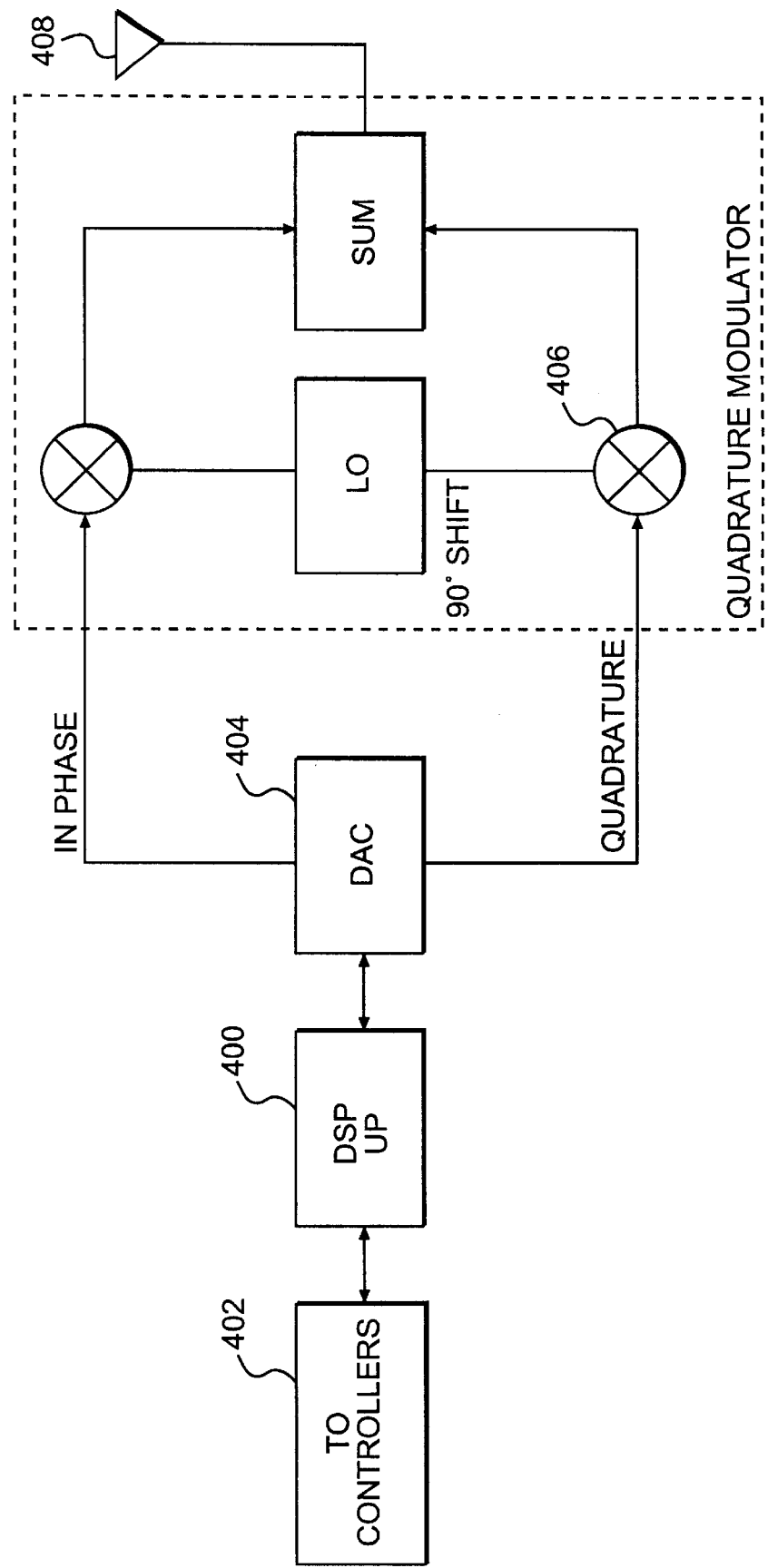
FIG. 6: Illustrates the narrowband exciter of the present invention.

Referring to FIG. 6, an inexpensive process for modulating any type of signal in a narrowband exciter is shown. The DSP 400 receives data from the Controller 402 and modulates it, thus creating phase and amplitude (I&Q) components. Each of the digital I&Q components are then restored to analog I&Q form using a Digital-to-Analog Converter (DAC) 404 and anti-aliasing filter. Without restricting the present invention in any way, an example of a DAC chip that is appropriate for this function includes: Harris HI5741. The anti-aliasing filter prevents any sin(x)/x effects. The output signals from the DAC are then applied to a direct quadrature modulator integrated circuit 406, which outputs an analog modulated signal to the antenna 408. An alternative embodiment of the present invention is to modulate the signal at an IF frequency and then up convert the signal to the desired RF.

This type of hybrid narrowband and wideband transceiver of the present invention has the advantage of being much less expensive than the typical multi-channel transceiver of the prior art, as well as providing a software defined radio transceiver with associated flexibility in modulation and protocol types. This transceiver of the present invention is also adaptable to both capacity intensive applications, where MCPA channel spacing can be tight, or to wide coverage applications with narrowband power amplifiers. This transceiver of the present invention is also advantageous where there is a link imbalance in terms of data transmission capacity. This type of imbalance occurs for applications like video-on-demand, and Internet subscribers who are accessing a Web page. Both video-on-demand and Internet subscribers require high bandwidth on the receive side and low bandwidth on the transmit side.

Although a hybrid radio tranceiver for wireless networks has been shown, it will be appreciated by those skilled in the art that other components may be substituted for those mentioned above without departing from the invention as disclosed and claimed.

What is claimed is:

1. A hybrid radio transceiver for wireless networks comprising:
   a controller connected to a network and adapted to exchange a plurality of transmit and receive signals with the network;
   a wideband receiver, connected to the controller and adapted to exchange the plurality of receive signals with the controller;
   a plurality of narrowband transmitters, each comprising a narrowband exciter connected to the controller and adapted to exchange the plurality of transmit signals with the controller;
   a duplexer, connected to the wideband receiver and adapted to exchange the plurality of transmit and receive signals with the wideband receiver and the plurality of narrowband transmitters; and
   an antenna, connected to the duplexer and adapted to exchange the plurality of transmit and receive signals with the duplexer.

2. The hybrid radio transceiver for wireless networks of claim 1, wherein each of the plurality of narrowband transmitters further comprises:
   a narrowband power amplifier, connected to the narrowband exciter and adapted to exchange the plurality of transmit signals with the narrowband exciter;
   a combiner, connected to the narrowband power amplifier and the duplexer and adapted to exchange the plurality of transmit signals with the narrowband power amplifier and the duplexer; and
   wherein the narrowband exciter processes the plurality of transmit signals through the narrowband power amplifier thereby providing a capability to transmit high power radio frequency energy through the combiner and the duplexer into the antenna.

3. The hybrid radio transceiver for wireless networks of claim 1, wherein each of the plurality of narrowband transmitters further comprises:
   a low power combiner, connected to the narrowband exciter and adapted to exchange the plurality of transmit signals with the narrowband exciter;
   a multi-carrier power amplifier (MCPA), connected to the low power combiner and the duplexer and adapted to exchange the plurality of transmit signals with the low power combiner and the duplexer; and
   wherein the narrowband exciter processes the plurality of transmit signals through the low power combiner providing a capability to transmit high power radio frequency energy through the MCPA and the duplexer into the antenna.

4. The hybrid radio transceiver for wireless networks of claim 2, wherein each of the narrowband exciters further comprises:
   a digital signal processor, connected to the controller and adapted to exchange the plurality of transmit signals with the controller;
   a digital-to-analog converter, connected to the digital signal processor and adapted to exchange the plurality of transmit signals with the digital signal processor;
   a direct quadrature modulator, connected to the digital-to-analog converter and the low power combiner and adapted to exchange the plurality of transmit signals with the digital-to-analog converter and the low power combiner; and
   wherein the digital signal processor provides a means for modulating digital data from the controller to create digital phase and amplitude components, which are applied to the direct quadrature modulator to output an analog modulated transmit signal to the antenna through the low power combiner, the MCPA and the duplexer.

5. The hybrid radio transceiver for wireless networks of claim 3, wherein each of the narrowband exciters further comprises:
   a digital signal processor, connected to the controller and adapted to exchange the plurality of transmit signals with the controller;
   a digital-to-analog converter, connected to the digital signal processor and adapted to exchange the plurality of transmit signals with the digital signal processor;

a direct quadrature modulator, connected to the digital-to-analog converter and the low power combiner and adapted to exchange the plurality of transmit signals with the digital-to-analog converter and the low power combiner; and wherein the digital signal processor provides a means for modulating digital data from the controller to create digital phase and amplitude components, which are applied to the direct quadrature modulator to output an analog modulated transmit signal to the antenna through the low power combiner, the MCPA and the duplexer.

6. The hybrid radio transceiver for wireless networks of claim 1, wherein the wideband receiver further comprises:

a wideband radio frequency receiver, connected to the duplexer and adapted to exchange the plurality of receive signals with the duplexer;

a high speed analog-to-digital converter, connected to the wideband radio frequency receiver adapted to exchange the plurality of receive signals with the wideband radio frequency receiver;

a plurality of high speed digital signal processors, each connected to the high speed analog-to-digital converter and adapted to exchange the plurality of receive signasl with the high speed analog-to-digital converter;

a plurality of low speed digital signal processors, each connected to one of the plurality of high speed digital signal processors and adapted to exchange the plurality of receive signals with one of the plurality of high speed digital signal processors; and wherein said wideband radio frequency receiver provides a means for conversion of the carrier radio frequency to an intermediate frequency, the intermediate frequency is digitized by the analog-to-digital converter and the receive signal is passed to the high speed digital signal processors for signal tuning, filtering and decimation, then the receive signal is passed to the low speed digital signal processors for demodulation and protocol control and interface to the network through the controller.

7. A method for modulating a transmit signal in a narrowband exciter in the hybrid radio transceiver for wireless networks comprising:

passing digital data from a controller to a digital signal processor for modulation;

creating digital phase and amplitude components by action of the digital signal processor;

passing the digital phase and amplitude components to a digital-to-analog converter and anti-aliasing filter;

converting the digital phase and amplitude components into analog phase and modulation components by action of the digital-to-analog converter and anti-aliasing filter;

applying the analog phase and amplitude components to a direct quadrature modulator circuit; and outputting an analog modulated signal to the transmitter antenna for subsequent wireless transmission.

* * * * *